(12) United States Patent
Kumar et al.

(10) Patent No.: US 12,267,259 B2
(45) Date of Patent: Apr. 1, 2025

(54) DECODING RELIABILITY FOR DEMODULATION REFERENCE SIGNAL (DMRS) BUNDLED TRANSMISSION USING PHASE TRACKING REFERENCE SIGNAL (PTRS) HOPPING

(71) Applicant: QUALCOMM Incorporated, San Diego, CA (US)

(72) Inventors: Satish Kumar, Hyderabad (IN); Sarath Pinayour Chandrasekaran, Hyderabad (IN); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 612 days.

(21) Appl. No.: 17/516,455

(22) Filed: Nov. 1, 2021

(65) Prior Publication Data

US 2023/0132509 A1    May 4, 2023

(51) Int. Cl.
*H04L 5/00* (2006.01)
*H04W 72/0446* (2023.01)
*H04W 72/0453* (2023.01)
*H04W 72/20* (2023.01)

(52) U.S. Cl.
CPC .......... *H04L 5/0012* (2013.01); *H04L 5/0051* (2013.01); *H04L 5/0082* (2013.01); *H04L 5/0096* (2013.01); *H04W 72/0446* (2013.01); *H04W 72/0453* (2013.01); *H04W 72/20* (2023.01)

(58) Field of Classification Search
CPC ... H04L 5/0012; H04L 5/0051; H04L 5/0082; H04L 5/0096; H04L 27/26132; H04L 5/0048; H04W 72/0446; H04W 72/0453; H04W 72/20
See application file for complete search history.

(56) References Cited

U.S. PATENT DOCUMENTS

| 2019/0215118 A1 | 7/2019 | Moles Cases et al. |
| 2020/0099489 A1* | 3/2020 | Sakamoto ............. H04L 1/0003 |
| 2020/0119882 A1* | 4/2020 | Zhang ...................... H04L 5/10 |
| 2020/0186311 A1 | 6/2020 | Xu et al. |
| 2020/0244415 A1* | 7/2020 | Liu ........................ H04L 5/0037 |

(Continued)

OTHER PUBLICATIONS

3GPP TSG-RAN WG1 R1-1718548, PTRS Considerations, Oct. 2017 (Year: 2017).*

(Continued)

*Primary Examiner* — Christopher M Crutchfield
*Assistant Examiner* — Aixa A Guadalupe Cruz
(74) *Attorney, Agent, or Firm* — Patterson & Sheridan, L.L.P.

(57) ABSTRACT

Certain aspects of the present disclosure provide a method for wireless communication by a user equipment (UE). The UE receives an indication of a phase tracking reference signal (PTRS) hopping offset from a network entity. The UE may process PTRSs transmitted in different transmissions across multiple symbols or time slots. In one example, processing the PTRSs may include transmitting the PTRSs in uplink (UL) slots. In another example, processing the PTRSs may include monitoring for the PTRSs in downlink (DL) slots. Frequency resources for the PTRSs may change across the different transmissions based on the PTRS hopping offset.

31 Claims, 12 Drawing Sheets

(56) References Cited

U.S. PATENT DOCUMENTS

| | | | | |
|---|---|---|---|---|
| 2020/0295893 A1* | 9/2020 | Maki | ............... | H04J 11/005 |
| 2021/0258200 A1* | 8/2021 | Lee | ............... | H04L 5/0051 |
| 2022/0294590 A1* | 9/2022 | Gao | ............... | H04L 5/0053 |
| 2023/0074690 A1* | 3/2023 | Kim | ............... | H04L 5/0023 |
| 2024/0154761 A1* | 5/2024 | Xiong | ............... | H04L 1/0009 |

OTHER PUBLICATIONS

Interdigital, et al., "Joint Channel Estimation for PUSCH", 3GPP TSG RAN WG1 #104-bis-e, R1-2103009, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 12, 2021-Apr. 20, 2021, Apr. 7, 2021 (Apr. 7, 2021), XP052177819, 11 Pages, Sections 2.2-2.3, paragraph [02.3].
International Search Report and Written Opinion—PCT/US2022/077484—ISA/EPO—Dec. 22, 2022.

\* cited by examiner

DECODING RELIABILITY FOR DEMODULATION REFERENCE SIGNAL (DMRS) BUNDLED TRANSMISSION USING PHASE TRACKING REFERENCE SIGNAL (PTRS) HOPPING

BACKGROUND

Field of the Disclosure

Aspects of the present disclosure relate to wireless communications, and more particularly, to techniques for processing phase tracking reference signals (PTRSs) transmitted in different transmissions across multiple symbols or time slots.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd generation partnership project (3GPP) long term evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New Radio (NR) (e.g., $5^{th}$ generation (5G)) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on a downlink (DL) and on an uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved and desirable techniques for processing phase tracking reference signals (PTRSs) transmitted in different repetitions across multiple time slots.

Certain aspects of the subject matter described in this disclosure can be implemented in a method for wireless communications by a user equipment (UE). The method generally includes receiving from a network entity an indication of at least one PTRS hopping offset, and processing PTRSs transmitted in different transmissions across multiple symbols or time slots wherein frequency resources for the PTRSs change across the different transmissions based on the at least one PTRS hopping offset.

Certain aspects of the subject matter described in this disclosure can be implemented in an apparatus for wireless communications by a UE. The apparatus generally includes at least one application processor and a memory configured to: receive from a network entity an indication of at least one PTRS hopping offset, and process PTRSs transmitted in different transmissions across multiple symbols or time slots wherein frequency resources for the PTRSs change across the different transmissions based on the at least one PTRS hopping offset.

Certain aspects of the subject matter described in this disclosure can be implemented in an apparatus for wireless communications by a UE. The apparatus generally includes means for receiving from a network entity an indication of at least one PTRS hopping offset, and means for processing PTRSs transmitted in different transmissions across multiple symbols or time slots wherein frequency resources for the PTRSs change across the different transmissions based on the at least one PTRS hopping offset.

Certain aspects of the subject matter described in this disclosure can be implemented in a computer readable medium storing computer executable code thereon for wireless communications by a UE. The computer readable medium generally includes code for receiving from a network entity an indication of at least one PTRS hopping offset, and code for processing PTRSs transmitted in different transmissions across multiple symbols or time slots wherein frequency resources for the PTRSs change across the different transmissions based on the at least one PTRS hopping offset.

Certain aspects of the subject matter described in this disclosure can be implemented in a method for wireless communications by a network entity. The method generally includes transmitting to a UE an indication of at least one PTRS hopping offset, and processing PTRSs transmitted in different transmissions across multiple symbols or time slots wherein frequency resources for the PTRSs change across different transmissions based on the at least one PTRS hopping offset.

Certain aspects of the subject matter described in this disclosure can be implemented in an apparatus for wireless communications by a network entity. The apparatus generally includes at least one application processor and a memory configured to: transmit to a UE an indication of at least one PTRS hopping offset, and process PTRSs transmitted in different transmissions across multiple symbols or time slots wherein frequency resources for the PTRSs change across different transmissions based on the at least one PTRS hopping offset.

Certain aspects of the subject matter described in this disclosure can be implemented in an apparatus for wireless communications by a network entity. The apparatus generally includes means for transmitting to a UE an indication of at least one PTRS hopping offset, and means for processing PTRSs transmitted in different transmissions across multiple symbols or time slots wherein frequency resources for the PTRSs change across different transmissions based on the at least one PTRS hopping offset.

Certain aspects of the subject matter described in this disclosure can be implemented in a computer readable medium storing computer executable code thereon for wireless communications by a network entity. The computer readable medium generally includes code for transmitting to a UE an indication of at least one PTRS hopping offset, and code for processing PTRSs transmitted in different transmissions across multiple symbols or time slots wherein frequency resources for the PTRSs change across different transmissions based on the at least one PTRS hopping offset.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure and the description may admit to other equally effective aspects.

FIG. 5 illustrates example transmissions associated with different repetitions of a TB with DMRSs and phase tracking reference signals (PTRSs), in accordance with certain aspects of the present disclosure.

FIG. 6 illustrates example transmissions associated with different repetitions of a TB with PTRSs across multiple time slots, in accordance with certain aspects of the present disclosure.

FIGS. 9 and 10 illustrate example transmissions associated with different repetitions of a TB with PTRSs across multiple time slots according to a PTRS hopping offset, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
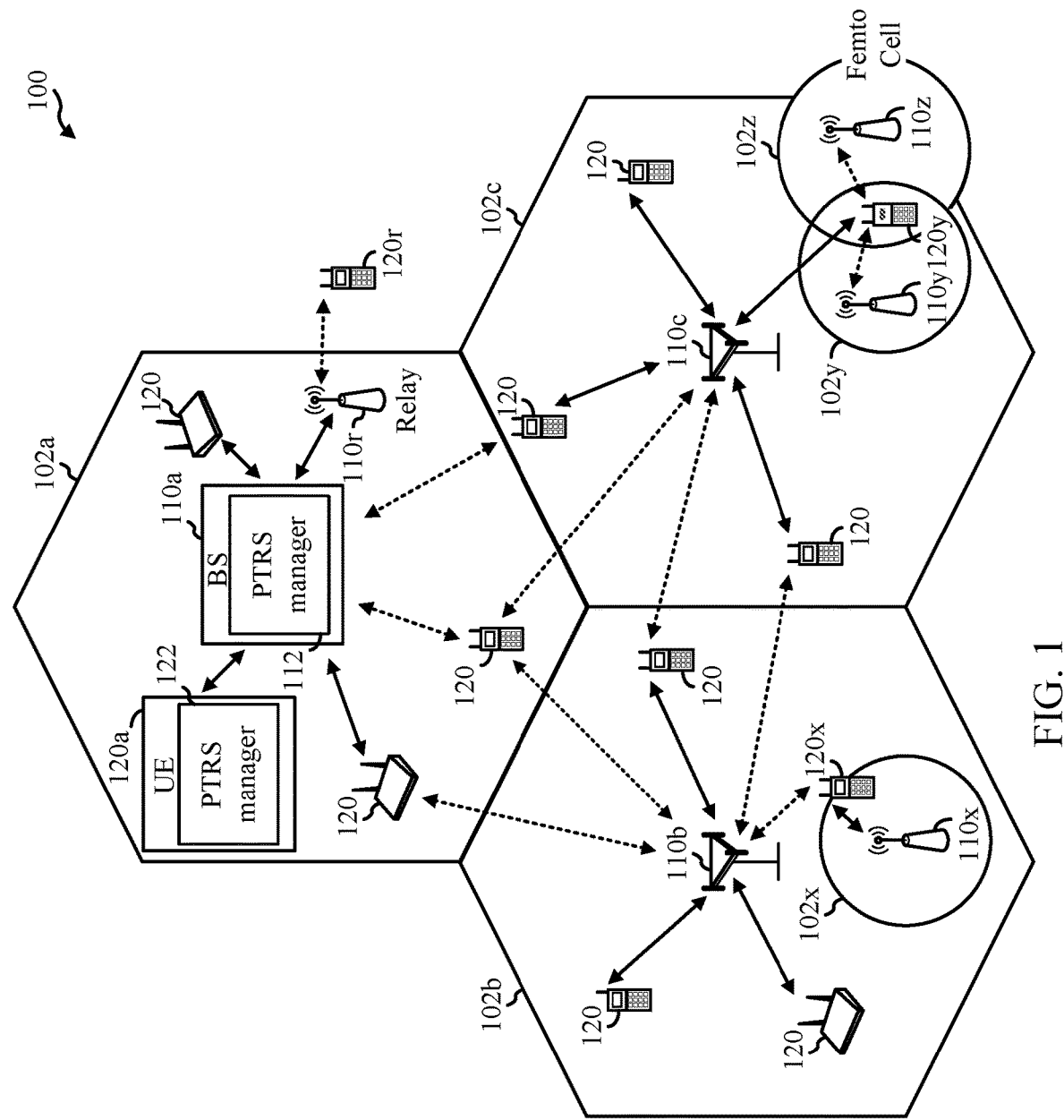
FIG. 1 is a block diagram conceptually illustrating an example wireless communication network, in accordance with certain aspects of the present disclosure.
Figure 1:
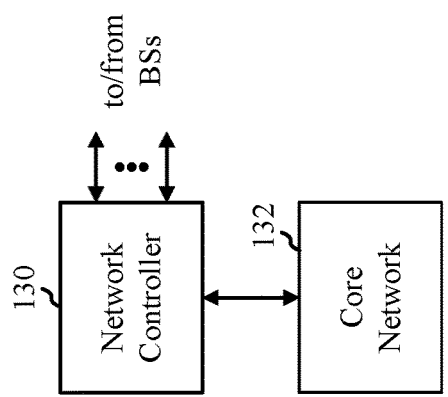

Aspects of the present disclosure provide apparatus, methods, processing systems, and computer readable mediums for a phase tracking reference signal (PTRS) hopping within a physical downlink shared channel (PDSCH)/physical uplink shared channel (PUSCH) transmission and/or repetitions of the PDSCH/PUSCH transmission.

For example, a network entity may send an indication of a PTRS hopping offset to a user equipment (UE). The UE may process PTRSs transmitted in different repetitions across multiple symbols or time slots, with frequency resources for the PTRSs changed across the different repetitions based on the PTRS hopping offset. The UE may transmit the PTRSs in uplink (UL) slots and/or receive (monitor for) the PTRSs in downlink (DL) slots.

Techniques described herein may improve decoding of a demodulation reference signal (DMRS) bundled transmission (e.g., including PTRSs in some repetitions along with DMRSs in other repetitions). For example, in conventional systems, a static configuration of PTRSs in case of a DMRS bundling (e.g., same frequency resources for the PTRSs across different repetitions) may result in a high code rate (e.g., due to a high number of repetitions). However, based on the techniques described herein, PTRSs are allocated on different frequency resources across repetitions according to a PTRS hopping offset. Accordingly, there is much better diversity as the PTRSs are spread across the different frequency resources. This may result in a lower code rate and aid in a coherent decoding of a DMRS bundled transmission.

The following description provides examples of processing of PTRSs in a communication system, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with $3^{rd}$ generation (3G), 4G, and/or new radio (e.g., 5G new radio (NR)) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

Example Wireless Communications System

FIG. 1 illustrates an example wireless communication network 100 in which aspects of the present disclosure may be performed. For example, according to certain aspects, the wireless communication network 100 may include base stations (BSs) 110 and/or user equipments (UEs) 120 configured for managing processing of phase tracking reference signals (PTRSs). As shown in FIG. 1, a UE 120a includes a PTRS manager 122 configured to perform operations 700 of FIG. 7, and a BS 110a includes a PTRS manager 112 configured to perform operations 800 of FIG. 8.

The wireless communication network 100 may be a new radio (NR) system (e.g., a $5^{th}$ generation (5G) NR network). As shown in FIG. 1, the wireless communication network 100 may be in communication with a core network. The core network may in communication with BSs 110a-z (each also individually referred to herein as a BS 110 or collectively as BSs 110) and/or UEs 120a-y (each also individually referred to herein as a UE 120 or collectively as UEs 120) in the wireless communication network 100 via one or more interfaces.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS 110 may support one or multiple cells.

The BSs 110 communicate with UEs 120 in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
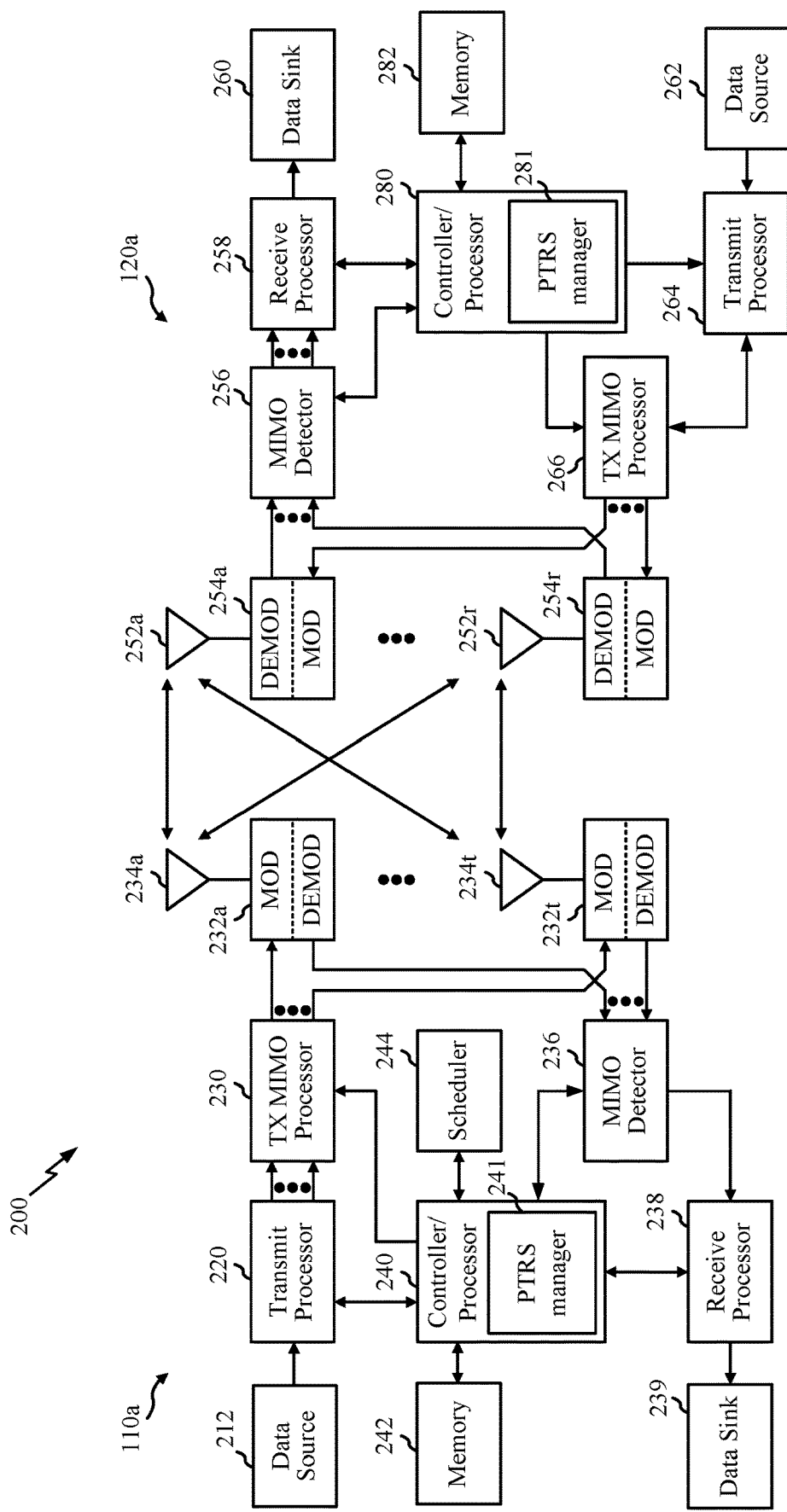
FIG. 2 is a block diagram conceptually illustrating a design of an example base station (BS) and a user equipment (UE), in accordance with certain aspects of the present disclosure.

FIG. 2 illustrates example components of a BS 110a and a UE 120a (e.g., in the wireless communication network 100 of FIG. 1).

At the BS 110a, a transmit processor 220 may receive data from a data source 212 and control information from a controller/processor 240. The control information may be for a physical broadcast channel (PBCH), a physical control format indicator channel (PCFICH), a physical hybrid ARQ (automatic repeat request) indicator channel (PHICH), a physical downlink control channel (PDCCH), a group common PDCCH (GC PDCCH), etc. The data may be for a physical downlink shared channel (PDSCH), etc. A medium access control—control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The transmit processor 220 may process (e.g., encode and symbol map) the data and control information to obtain data symbols and control symbols, respectively. The transmit processor 220 may also generate reference symbols, such as for a primary synchronization signal (PSS), a secondary synchronization signal (SSS), and a channel state information reference signal (CSI-RS). A transmit multiple-input multiple-output (MIMO) processor 230 may perform spatial processing (e.g., precoding) on the data symbols, the control symbols, and/or the reference symbols, if applicable, and may provide output symbol streams to modulators (MODs) in transceivers 232a-232t. Each MOD in transceivers 232a-232t may process a respective output symbol stream (e.g., for orthogonal frequency division multiplexing (OFDM), etc.) to obtain an output sample stream. Each MOD in transceivers 232a-232t may further process (e.g., convert to analog, amplify, filter, and upconvert) the output sample stream to obtain a downlink (DL) signal. The DL signals from the MODs in transceivers 232a-232t may be transmitted via antennas 234a-234t, respectively.

At the UE 120a, antennas 252a-252r may receive DL signals from the BS 110a and may provide received signals to demodulators (DEMODs) in transceivers 254a-254r, respectively. Each DEMOD in the transceiver 254 may condition (e.g., filter, amplify, downconvert, and digitize) a respective received signal to obtain input samples. Each DEMOD in the transceiver 254 may further process the input samples (e.g., for OFDM, etc.) to obtain received symbols. A MIMO detector 256 may obtain received symbols from all the DEMODs in the transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On an uplink (UL), at the UE 120a, a transmit processor 264 may receive and process data (e.g., for a PUSCH) from a data source 262 and control information (e.g., for a physical uplink control channel (PUCCH) from the controller/processor 280. The transmit processor 264 may also generate reference symbols for a reference signal (e.g., for a sounding reference signal (SRS)). The symbols from the transmit processor 264 may be precoded by a transmit MIMO processor 266 if applicable, further processed by the MODs in transceivers 254a-254r (e.g., for SC-FDM, etc.), and transmitted to the BS 110a. At the BS 110a, the UL signals from the UE 120a may be received by the antennas 234, processed by the DEMODs in transceivers 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

Memories 242 and 282 may store data and program codes for the BS 110a and the UE 120a, respectively. A scheduler 244 may schedule the UE 120a for data transmission on a DL and/or an UL.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a PTRS manager 241 that may be configured to perform the operations illustrated in FIG. 8, as well as other operations disclosed herein. As shown in FIG. 2, the controller/processor 280 of the UE 120a has a PTRS manager 281 that may be configured to perform the operations illustrated in FIG. 7, as well as other operations disclosed herein. Although shown at the controller/processor, other components of the UE 120a and the BS 110a may be used to perform the operations described herein.

NR may utilize OFDM with a cyclic prefix (CP) on the UL and the DL. The NR may support half-duplex operation using time division duplexing (TDD). The OFDM and single-carrier frequency division multiplexing (SC-FDM) partition system bandwidth into multiple orthogonal subcarriers, which are also commonly referred to as tones, bins, etc. Each subcarrier may be modulated with data. Modulation symbols may be sent in a frequency domain with the OFDM and in a time domain with the SC-FDM. The spacing between adjacent subcarriers may be fixed, and a total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. The NR may support a base subcarrier spacing (SCS) of 15 KHz and other SCS may be defined with respect to the base SCS (e.g., 30 kHz, 60 kHz, 120 kHz, 240 kHz, etc.).

Figure 3:
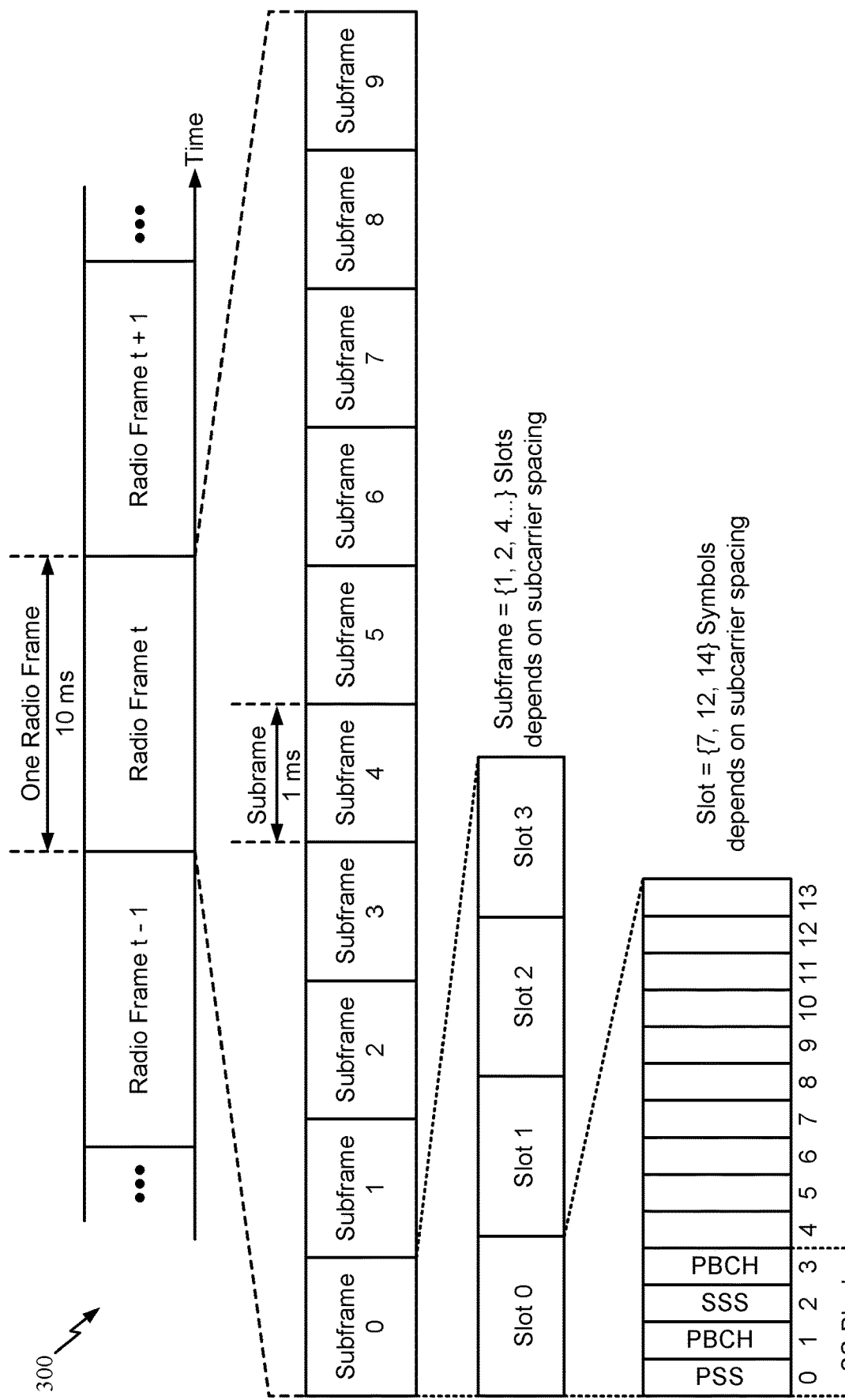
FIG. 3 is an example frame format for certain wireless communication systems (e.g., a new radio (NR)), in accordance with certain aspects of the present disclosure.

FIG. 3 is a diagram showing an example of a frame format 300 for NR. A transmission timeline for each of DL and UL may be partitioned into units of radio frames. Each radio frame may have a predetermined duration (e.g., 10 ms), and may be partitioned into 10 subframes, each of 1 ms, with indices of 0 through 9. Each subframe may include a variable number of slots (e.g., 1, 2, 4, 8, 16, . . . slots) depending on a SCS. Each slot may include a variable number of symbol periods (e.g., 7, 12, or 14 symbols) depending on the SCS. Symbol periods in each slot may be assigned indices. A sub-slot structure may refer to a transmit time interval having a duration less than a slot (e.g., 2, 3, or 4 symbols). Each symbol in a slot may be configured for a link direction (e.g., a DL, an UL, or a flexible) for data transmission, and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and the SSS may be used by UEs for cell search and acquisition. The PSS may provide half-frame timing, a synchronization signal (SS) may provide a CP length and frame timing. The PSS and the SSS may provide cell identity. The PBCH carries some basic system information, such as DL system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a PDSCH in certain subframes. The SSB can be transmitted up to sixty-four times, for example, with up to sixty-four different beam directions for mmWave. The multiple transmissions of the SSB are referred to as a SS burst set. The SSBs in an SS burst set may be transmitted in the same frequency region, while the SSBs in different SS bursts sets can be transmitted at different frequency regions.

Example Phase Tracking Reference Signals (PTRSs)

In new radio (NR), phase tracking reference signals (PTRSs) are used to track a phase of a local oscillator (LO) at a transmitter and a receiver. For example, a user equipment (UE) may use downlink (DL) PTRSs (in a physical downlink shared channel (PDSCH)) to track phase of its LO, while a network entity (e.g., a gNB) may use uplink (UL) PTRSs (in a physical uplink shared channel (PUSCH)) to track phase of its LO. The phase tracking may enable suppression of a phase noise and a common phase error (CPE), particularly at higher (e.g., mmWave) frequencies.

In NR, radio resource control (RRC) signaling may provide semi-statically configurations for DL PTRSs and UL PTRSs. The particular time and frequency-domain resources (presence and density) for PTRSs may be dynamically determined. For example, time density (e.g., which symbols) is determined by a scheduled modulation and coding scheme (MCS), while frequency density is determined by a scheduled bandwidth (e.g., in number of resource blocks (RBs)).

In some cases, PTRSs may be used to estimate and correct phase for quadrature amplitude modulation (QAM) modulated signals. In some cases, an impact of a phase noise is more for a UE allocated with a higher MCS as the modulation order increases.

The PTRSs may be configured depending on a quality of oscillators, a carrier frequency, a subcarrier spacing, and/or a MCS that a transmission uses. In some cases, a UE may receive signaling indicating parameters (e.g., K_ptrs, L_ptrs and Kref), which may specify resource elements (REs) allocated for the PTRSs within a PDSCH in a DL or a PUSCH in an UL allocated time-frequency resources of the UE. In some cases (e.g., for a given PTRS time-frequency density), Kref may be used to shift PTRS REs in a frequency domain within a resource block (RB).

Example Demodulation Reference Signal (DMRS) Bundling

New radio (NR) supports an aggregation of a transmission up to 8 repetitions for coverage enhancement. For these repetitions of the transmission, done intra or inter slot, the NR may support bundling of demodulation reference signals (DMRSs) in a time domain across one or more time slots, to enable coherent decoding of a DMRS bundled transmission. A DMRS is used by a receiver for a radio channel estimation for a demodulation of associated physical channel. DMRS design and mapping may be specific to each downlink (DL) and uplink (UL) NR channels.

When DMRS bundling is configured, a user equipment (UE) may perform (joint) channel estimation based on DMRSs received across multiple symbols or slots, as opposed to performing channel estimation separately for each individual slot based on the DMRSs received in that slot. For example, DMRSs are transmitted with control channels (e.g., physical downlink control channels (PDCCHs)) that enable receiving devices to bundle (e.g., coherently combine) the DMRSs over time. The DMRSs can be coherently transmitted over different time instants. At a receiver, estimates of a channel determined based on the DMRSs in the different time instants can be coherently combined to enhance a channel estimation performance and improve an accuracy of channel estimation.

Figure 4:
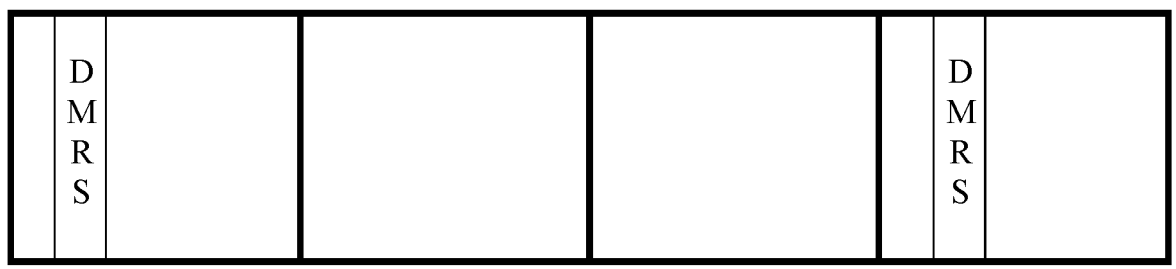
FIG. 4 illustrates example transmissions associated with different repetitions of a transport block (TB) with demodulation reference signals (DMRSs) bundling, in accordance with certain aspects of the present disclosure.

In some cases, when DMRSs are transmitted across different time slots, the DMRSs may be enabled only on certain repetitions. For example, as illustrated in FIG. 4, only first and last repetitions are enabled with the DMRSs. Middle repetitions may not be allocated with the DMRSs to decrease a code rate in those transport blocks (TBs). Accordingly, although the lower code rate is achieved by not allocating the middle repetitions with the DMRSs, it may also result in a reduced channel estimation performance.

Figure 5:
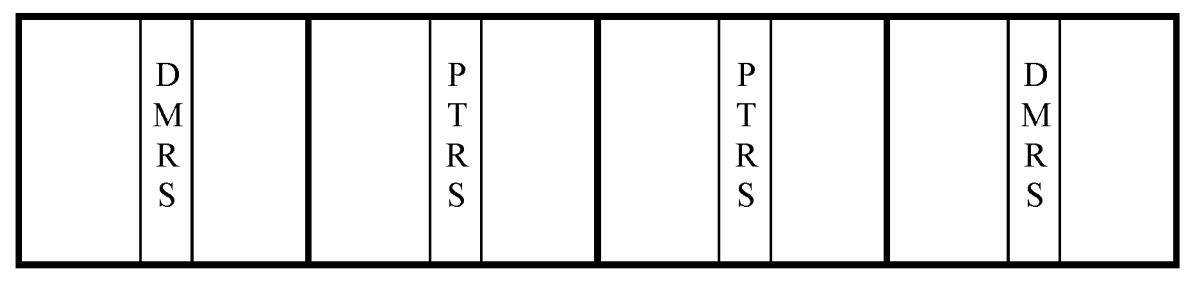
Figure 6:
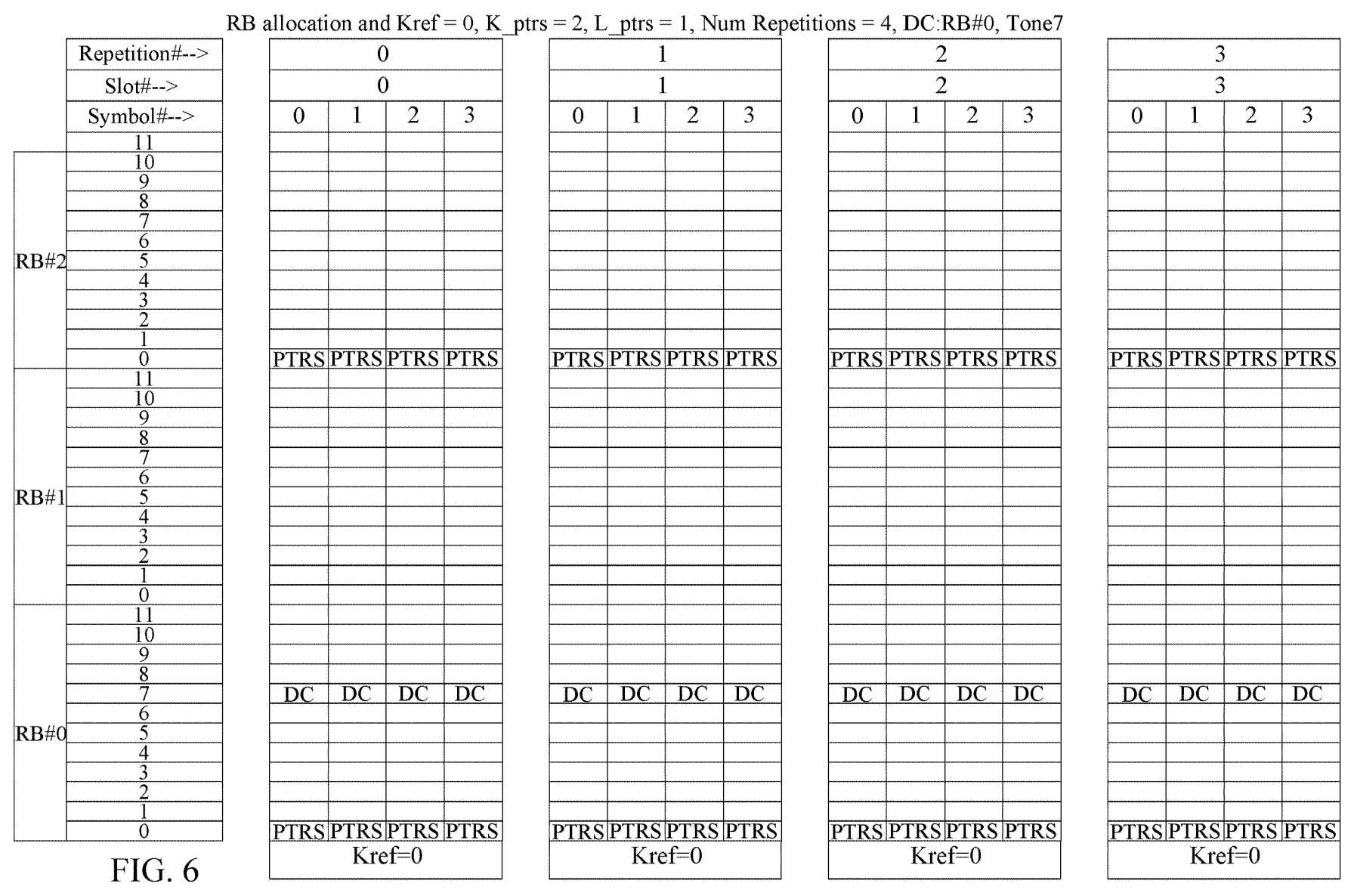

To further improve performance, as illustrated in FIG. 5, low density reference signals (e.g., phase tracking reference signals (PTRSs)) are allocated in middle repetitions that are not allocated with DMRSs. This may enable to maintain a lower code rate and phase continuity across transmissions, and aid in coherent decoding of data. As illustrated in FIG. 6, PTRSs are transmitted in different repetitions (e.g., 4 repetitions) across multiple slots (e.g., 4 slots) and symbols based on a static PTRS configuration (e.g., same frequency resources for the PTRSs across the different repetitions).

In some cases (e.g., use cases with longer repetitions and sub-6 operations), PTRS density has to be adjusted to improve performance (e.g., achieve lower code rate). However, to further improve the performance, if the PTRS density is increased, it will result in defeating the purpose of DMRS bundling and limit the code rate in repetitions where the PTRS density is increased.

Example PTRS Hopping in Different Repetitions Based on PTRS Hopping Offset

Aspects of the present disclosure provide apparatus, methods, processing systems, and computer readable mediums for a phase tracking reference signal (PTRS) hopping within a physical downlink shared channel (PDSCH)/physical uplink shared channel (PUSCH) transmission and/or repetitions of the PDSCH/PUSCH transmission.

The PTRS hopping (e.g., change in frequency resources for PTRSs across different repetitions based on a PTRS hopping offset) may enable demodulation reference signal (DMRS) bundling (including PTRSs repetitions) with a higher efficiency. For example, in conventional systems, a static PTRS configuration in case of the DMRS bundling (e.g., same frequency resources for PTRSs across different repetitions) may result in a high code rate (e.g., due to a high number of repetitions). However, based on techniques described herein, PTRSs are allocated on different frequency resources across repetitions according to a PTRS hopping offset. Accordingly, there is a better diversity as the PTRSs are spread across the different frequency resources. This may result in a lower code rate and aid in a coherent decoding of a DMRS bundled transmission.

Figure 7:
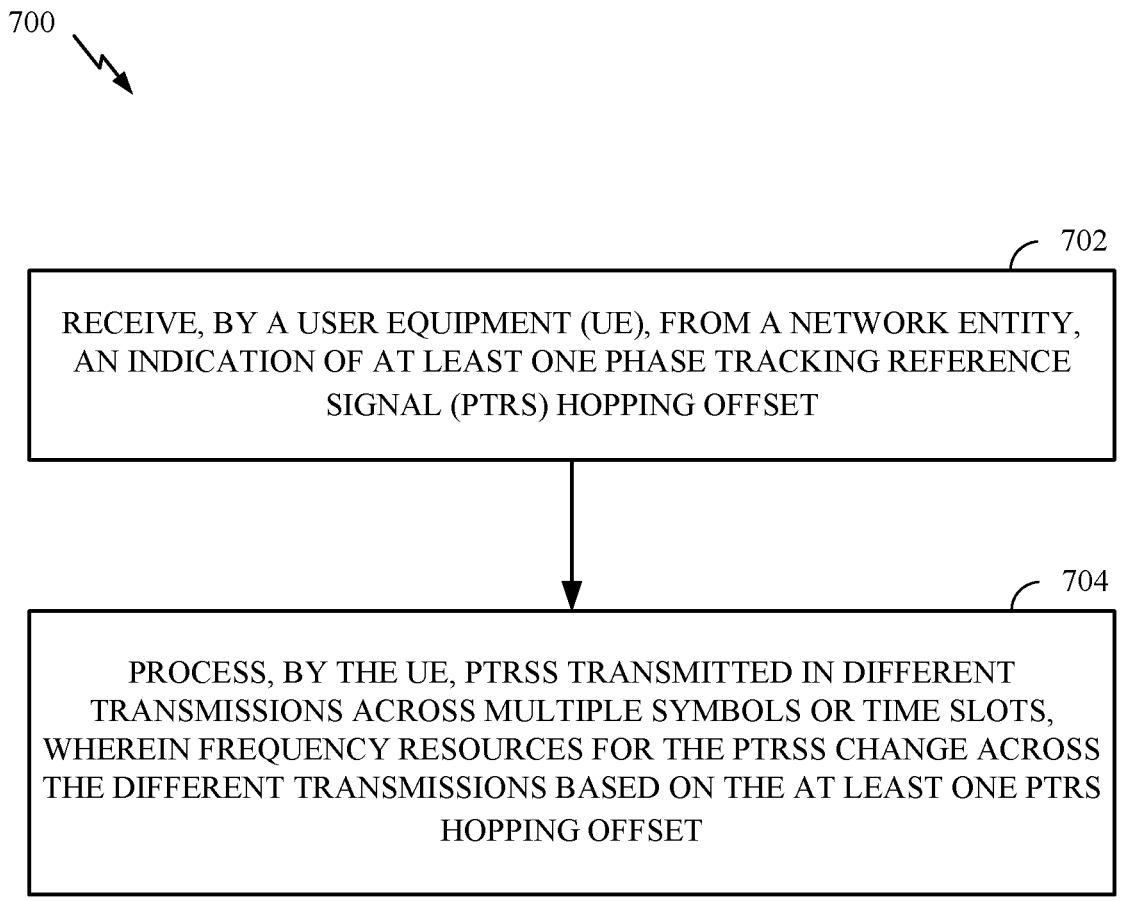
FIG. 7 is a flow diagram illustrating example operations for wireless communications by a UE, in accordance with certain aspects of the present disclosure.

FIG. 7 is a flow diagram illustrating example operations 700 for wireless communication by a user equipment (UE), in accordance with certain aspects of the present disclosure. The operations 700 may be performed, for example, by the UE 120*a* in the wireless communication network 100. The operations 700 may be implemented as software components that are executed and run on one or more processors (e.g., the controller/processor 280 of FIG. 2). Further, the transmission and reception of signals by the UE in operations 700 may be enabled, for example, by one or more antennas (e.g., the antennas 252 of FIG. 2). In certain aspects, the transmission and/or reception of signals by the UE may be implemented via a bus interface of one or more processors (e.g., the controller/processor 280) obtaining and/or outputting signals.

The operations 700 begin, at 702, by receiving, from a network entity, an indication of at least one PTRS hopping offset. For example, the UE may receive the indication of the at least one PTRS hopping offset from the network entity using antenna(s) and receiver/transceiver components of the UE 120a shown in FIG. 1 or FIG. 2 and/or of the apparatus shown in FIG. 11.

At 704, the UE process PTRSs transmitted in different transmissions across multiple symbols or time slots, and frequency resources for the PTRSs change across the different transmissions based on the at least one PTRS hopping offset. For example, the UE may process the PTRSs transmitted in the different transmissions across the multiple symbols or time slots using a processor, antenna(s), and/or transceiver components of the UE 120a shown in FIG. 1 or FIG. 2 and/or of the apparatus shown in FIG. 11. The different transmissions are part of an aggregated or a repetition mode of a transmission. In certain aspects, processing the PTRSs may include transmitting the PTRSs in uplink (UL) slots. In certain aspects, processing the PTRSs may include monitoring for the PTRSs in downlink (DL) slots.

Figure 8:
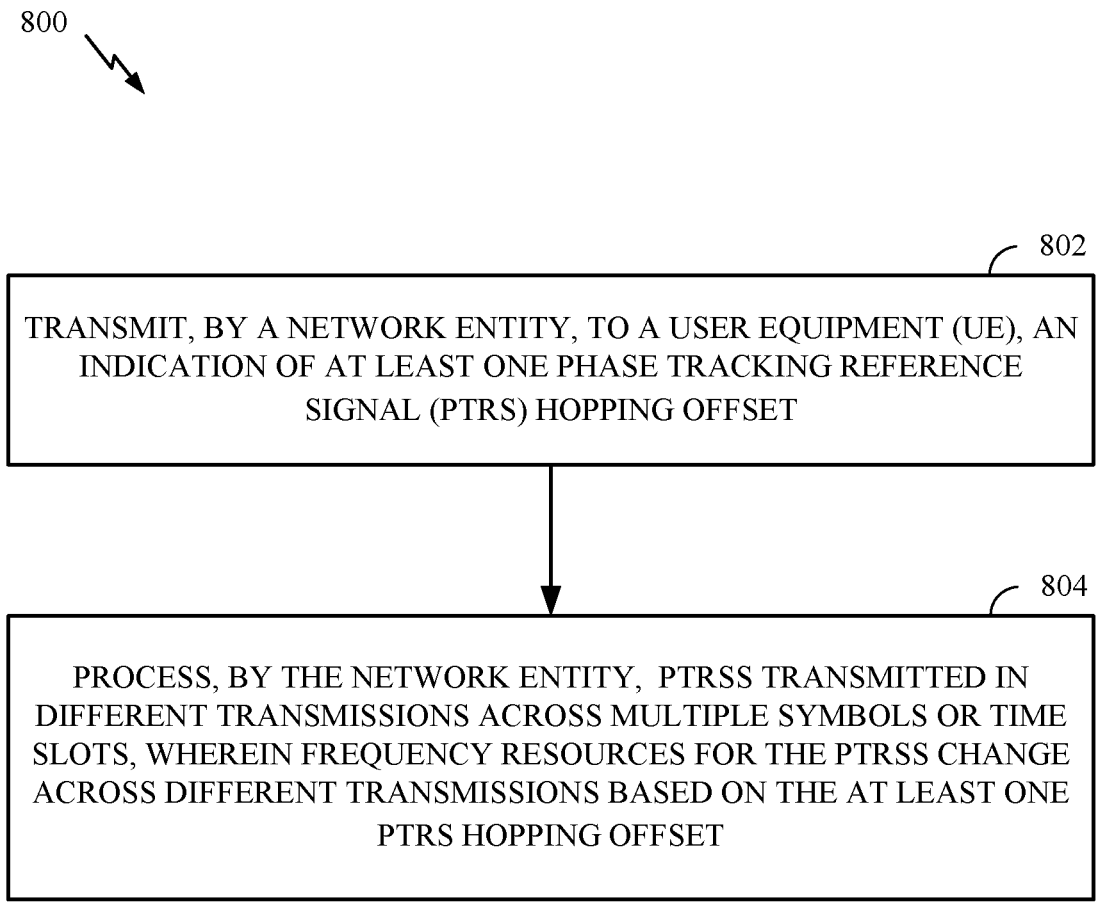
FIG. 8 is a flow diagram illustrating example operations for wireless communications by a network entity, in accordance with certain aspects of the present disclosure.

FIG. 8 is a flow diagram illustrating example operations 800 for wireless communication by a network entity, in accordance with certain aspects of the present disclosure. The operations 800 may be performed, for example, by a network entity (e.g., such as the BS 110a in the wireless communication network 100). The operations 800 may be implemented as software components that are executed and run on one or more processors (e.g., the controller/processor 240 of FIG. 2). Further, the transmission and reception of signals by the network entity in operations 800 may be enabled, for example, by one or more antennas (e.g., the antennas 234 of FIG. 2). In certain aspects, the transmission and/or reception of signals by the network entity may be implemented via a bus interface of one or more processors (e.g., the controller/processor 240) obtaining and/or outputting signals.

The operations 800 begin, at 802, by transmitting, to a UE, an indication of at least one PTRS hopping offset. For example, the network entity may transmit the indication of the at least one PTRS hopping offset to the UE using antenna(s) and transmit/transceiver components of the BS 110a shown in FIG. 1 or FIG. 2 and/or of the apparatus shown in FIG. 12.

At 804, the network entity process PTRSs transmitted in different transmissions across multiple symbols or time slots, and frequency resources for the PTRSs change across different transmissions based on the at least one PTRS hopping offset. For example, the network entity may process the PTRSs transmitted in the different transmissions across the multiple symbols or time slots using a processor, antenna(s), and/or transceiver components of the BS 110a shown in FIG. 1 or FIG. 2 and/or of the apparatus shown in FIG. 12. In certain aspects, processing the PTRSs may include monitoring the PTRSs in UL slots. In certain aspects, processing the PTRSs may include transmitting for the PTRSs in DL slots.

Figure 9:
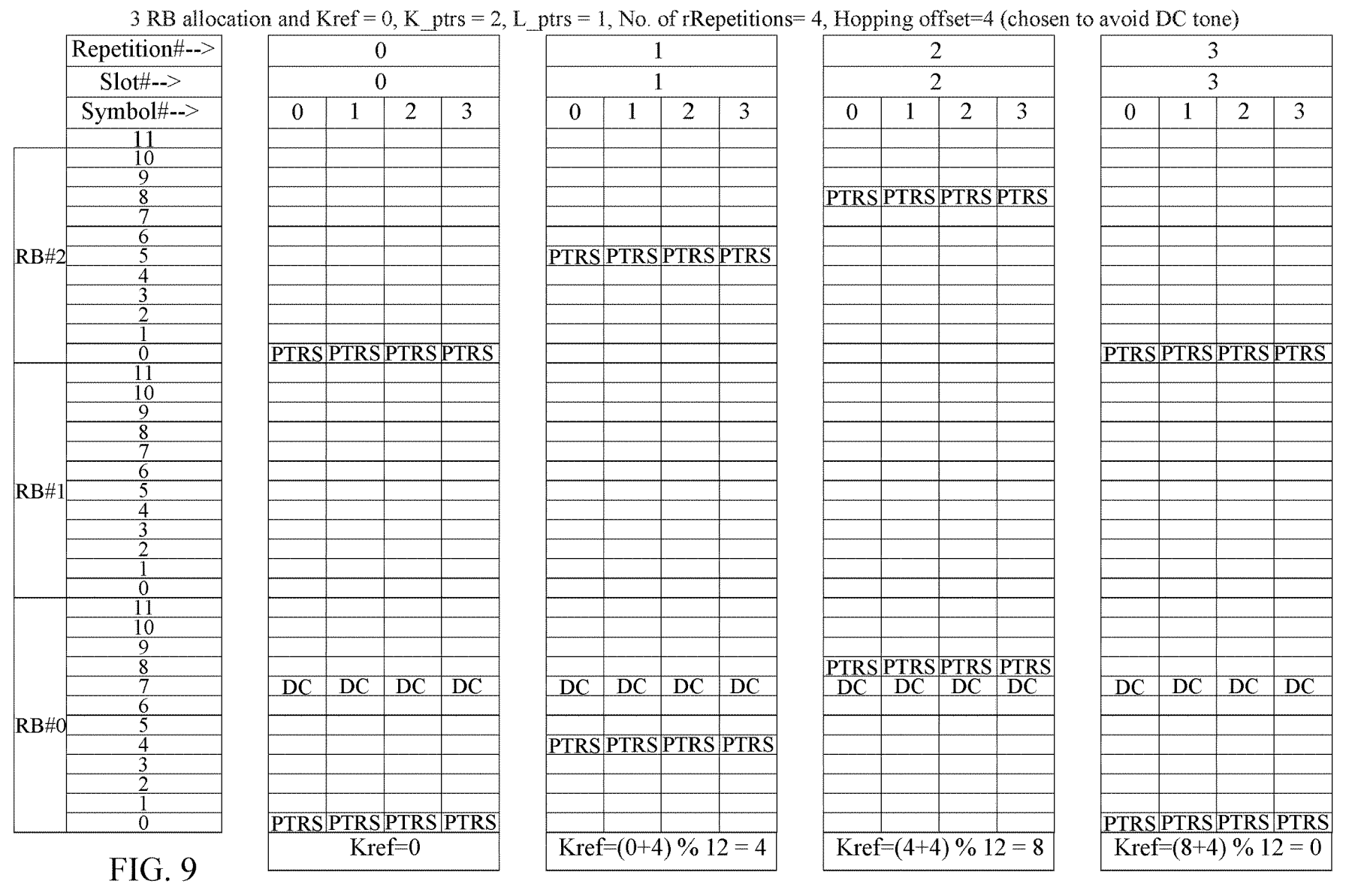
Figure 10:
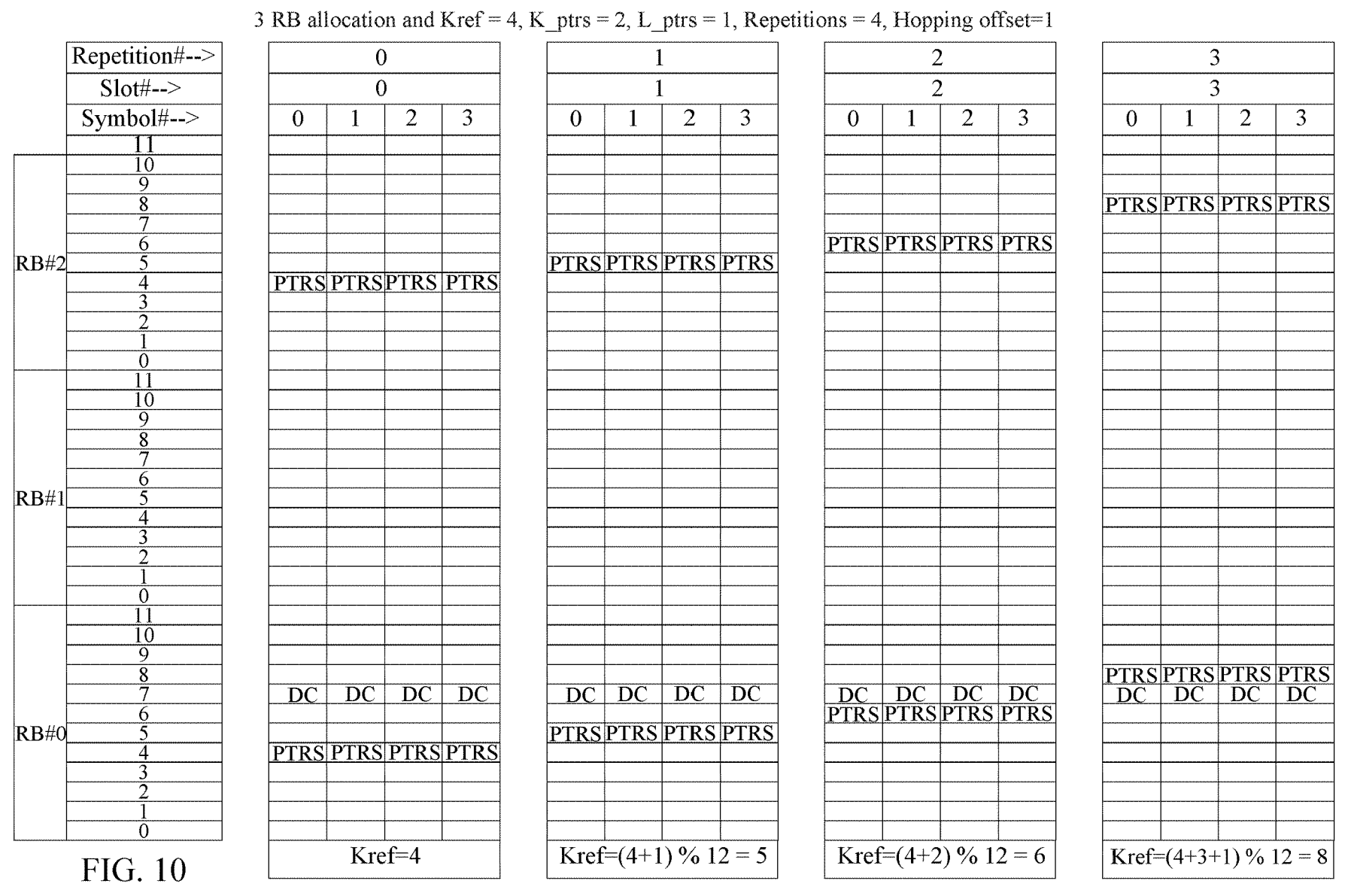

The operations shown in FIGS. 7 and 8 may be understood with reference to FIGS. 9 and 10.

In certain aspects, a network entity sends signaling indicating a parameter (e.g., Kref) to a UE. The parameter indicates an initial value (e.g., the value may be 0 to 11) of a PTRS subcarrier for PTRSs in a configurable transmission offset from an initial transmission. The UE may determine frequency resources for the PTRSs in each subsequent transmission after the initial transmission based on a first algorithm (e.g., (Kref+PTRS hopping offset)/12). In the first algorithm, Kref represents a value of a PTRS subcarrier for a previous transmission.

As illustrated in FIG. 9, PTRSs are transmitted in different repetitions (e.g., 4 repetitions) across multiple slots (e.g., 4 slots) and symbols. In the illustrated example, a network entity allocates 3 resource blocks (RBs) for the PTRSs. The network entity configures a value of Kref (e.g., an initial value of a PTRS subcarrier) for the PTRSs in an initial repetition (e.g., repetition number 0) to be 0. The network entity configures a value of a PTRS hopping offset to be 4. For every scheduled repetition of the PTRSs, allocation of frequency resources for the PTRSs is shifted and the frequency resources for the PTRSs are determined based on a first algorithm. For example, in a next repetition (e.g., repetition number 1) of the PTRSs after the initial repetition, a new value of Kref for the PTRSs is determined based on the first algorithm (e.g., (0+4)/12=4) based on a value of the Kref for a previous repetition (e.g., 0) and the PTRS hopping offset. In a subsequent repetition (e.g., repetition number 2) of the PTRSs, a new value of Kref for the PTRSs is determined based on the first algorithm (e.g., (4+4)/12=8) based on a value of the Kref for a previous repetition (e.g., 4) and the PTRS hopping offset. In a last repetition (e.g., repetition number 3) of the PTRSs, a new value of Kref for the PTRSs is determined based on the first algorithm (e.g., (8+4)/12=0) based on a value of the Kref for a previous repetition (e.g., 8) and the PTRS hopping offset. Accordingly, the PTRSs are spread across the different frequency resources across the repetitions according to the PTRS hopping offset.

In certain aspects, a UE may detect a collision between frequency resources (e.g., determined for PTRSs in a given repetition using a first algorithm) with a direct current (DC) subcarrier. When the collision is detected, the UE may adjust the frequency resources determined for the PTRSs using the first algorithm to avoid the collision.

As illustrated in FIG. 10, PTRSs are transmitted in different repetitions (e.g., 4 repetitions) across multiple slots (e.g., 4 slots) and symbols. A network entity configures a value of Kref (e.g., an initial value of a PTRS subcarrier) for the PTRSs in an initial repetition (e.g., repetition number 0) to be 4. The network entity configures a value of a PTRS hopping offset to be 1. A UE determines frequency resources for the PTRSs in each subsequent repetition after the initial repetition based on a first algorithm. In a last repetition (e.g., repetition number 3) of the PTRSs, the UE may detect a collision between the determined frequency resources for the PTRSs using the first algorithm with a DC subcarrier. To prevent this collision, the UE determines a new value of Kref for the PTRSs in the last repetition based on a second algorithm (e.g., (Kref+PTRS hopping offset+1)/12). The determined frequency resources for the PTRSs using the second algorithm avoid the collision with the DC subcarrier.

In certain aspects, to prevent cases where PTRS resource elements (REs) may collide with a DC subcarrier, a network entity may configure a value of a PTRS hopping offset such that there is no collision between the PTRS REs and the DC subcarrier.

In certain aspects, a UE receives signaling (e.g., a downlink control information (DCI) or a medium access control (MAC) control element (CE)) from a network entity enabling PTRS hopping in different transmissions across multiple symbols or time slots according to a PTRS hopping offset. For example, the PTRS hopping may be enabled in a PUSCH transmission, and one or more repetitions of the PUSCH transmission, according to the PTRS hopping offset. In another example, the PTRS hopping may be enabled in a PDSCH transmission, and one or more repetitions of a PDSCH transmission, according to the PTRS hopping offset. When the PTRS hopping is enabled, PTRSs are spread across different frequency resources across repetitions according to the PTRS hopping offset.

In certain aspects, a UE receives signaling from a network entity disabling PTRS hopping in different transmissions across multiple symbols or time slots. When the PTRS hopping is disabled, PTRSs are not spread across different frequency resources across repetitions. In certain aspects, a UE receives signaling from a network entity indicating an updated value of a PTRS hopping offset. Accordingly, PTRSs are then spread across different frequency resources across repetitions according to the updated value of the PTRS hopping offset.

In certain aspects, a UE receives signaling from a network entity indicating a reset of a number of hops. After the reset, the UE may determine PTRS frequency resources for a subsequent transmission of PTRSs, based on an initial value of a PTRS subcarrier. In some cases, while deciding on all the hops and an offset of a RE used for the hop, a network entity may consider DL or UL UE reported DC subcarrier location to avoid PTRS REs falling on a DC tone.

In certain aspects, a UE receives an indication from a network entity indicating different PTRS configurations corresponding to different PTRS hopping offsets. In one example, the different PTRS hopping offsets are based on different modulation and coding schemes (MCSs). In another example, the different PTRS hopping offsets are based on different frequency ranges. In another example, the different PTRS hopping offsets are based on different bands. In another example, the different PTRS hopping offsets are based on different subcarrier spacings. In another example, the different PTRS hopping offsets are based on one or more of the different MCSs, frequency ranges, bands, and subcarrier spacings. In certain aspects, a UE may receive signaling from a network entity to dynamically switch ON or OFF the different PTRS configurations. In certain aspects, a UE may receive signaling from a network entity to enable a particular PTRS configuration from the different PTRS configurations.

In certain aspects, a UE may be configured with multiple codewords for multi-layer scheduling/transmissions. In such cases, the UE may receive an indication from a network entity indicating different PTRS hopping offsets corresponding to different codewords.

In certain aspects, a network entity may configure multiple UEs in multi user (MU) multiple input multiple output (MIMO) mode with PTRS configurations. In such cases, the network entity may transmit to each UE rate matching patterns and the PTRS configurations of other UEs.

Techniques described herein may be utilized in cases where a transport block (TB) allocation in a slot has an overlap (e.g., rate matching) with other reference signals (RSs) such as channel state information—RSs (CSI-RSs). In such cases, a parameter (e.g., in the form of a hopping offset) provides a flexibility to avoid the overlap with the other RSs. The techniques described herein may also provide a flexibility of choosing a different PTRS hopping offset to avoid any collision with a DC subcarrier.

The techniques described herein may overcome problems associated with a static PTRS configuration in case of DMRS bundling and longer repetitions, and enable the DMRS bundling with more efficiency. For example, based on the techniques described herein, over repetitions with non-allocated DMRSs, PTRSs are allocated on different frequency resources across repetitions according to a PTRS hopping offset. Accordingly, there is much better diversity as the PTRSs are spread across the different frequency resources, and this may aid in a coherent decoding of a DMRS bundled transmission. Furthermore, the techniques described herein may enable PTRSs allocation in DMRS slots, and PTRS RE hopping may occur in a transmission/repetition that may have DMRS symbols. Also, the techniques described herein may not break any rule of a phase estimation within an allocation of a TB, as within the allocation, the PTRS location is not hopped (since PTRSs are only hopped from one TB to other TB).

Example Wireless Communication Devices

Figure 11:
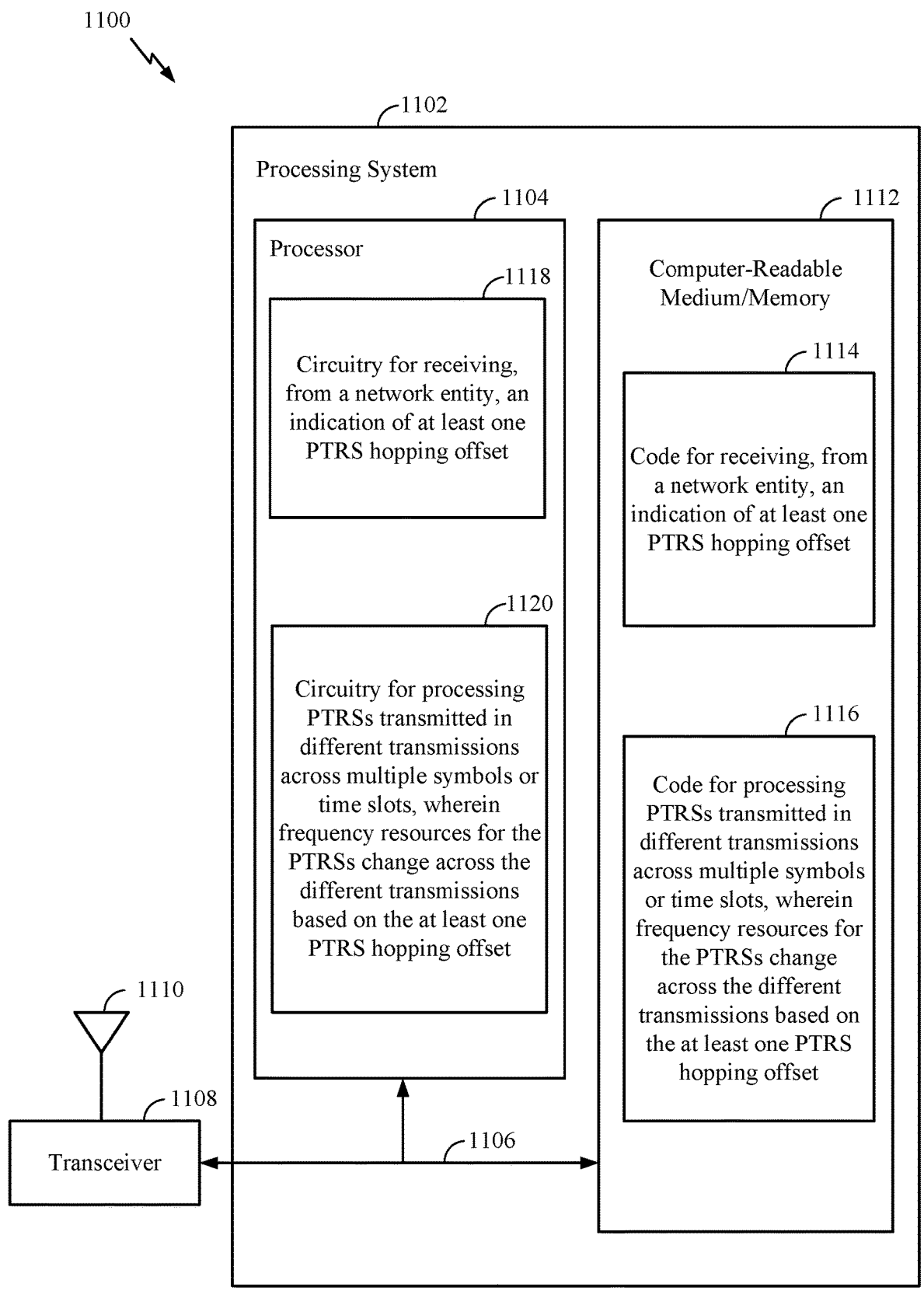
FIG. 11 illustrates a communications device that may include various components configured to perform operations for the techniques disclosed herein, in accordance with certain aspects of the present disclosure.

FIG. 11 illustrates a communications device 1100 that may include various components (e.g., corresponding to means-plus-function components) configured to perform operations for the techniques disclosed herein, such as the operations illustrated in FIG. 7. The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 is configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., a computer-executable code) that when executed by the processor 1104, cause the processor 1104 to perform the operations illustrated in FIG. 7, or other operations for performing the various techniques discussed herein. In certain aspects, computer-readable medium/memory 1112 stores code 1114 for receiving and code 1116 for processing. The code 1114 for receiving may include code for receiving, from a network entity, an indication of at least one phase tracking reference signal (PTRS) hopping offset. The code 1116 for processing may include code for processing PTRSs transmitted in different transmissions across multiple symbols or time slots wherein frequency resources for the PTRSs change across the different transmissions based on the at least one PTRS hopping offset.

The processor 1104 may include circuitry configured to implement the code stored in the computer-readable medium/memory 1112, such as for performing the operations illustrated in FIG. 7, as well as other operations for performing the various techniques discussed herein. For example, the processor 1104 includes circuitry 1118 for receiving and circuitry 1120 for processing. The circuitry 1118 for receiving may include circuitry for receiving, from a network entity, an indication of at least one PTRS hopping offset. The circuitry 1120 for processing may include circuitry for processing PTRSs transmitted in different transmissions across multiple symbols or time slots wherein frequency resources for the PTRSs change across the different transmissions based on the at least one PTRS hopping offset.

Figure 12:
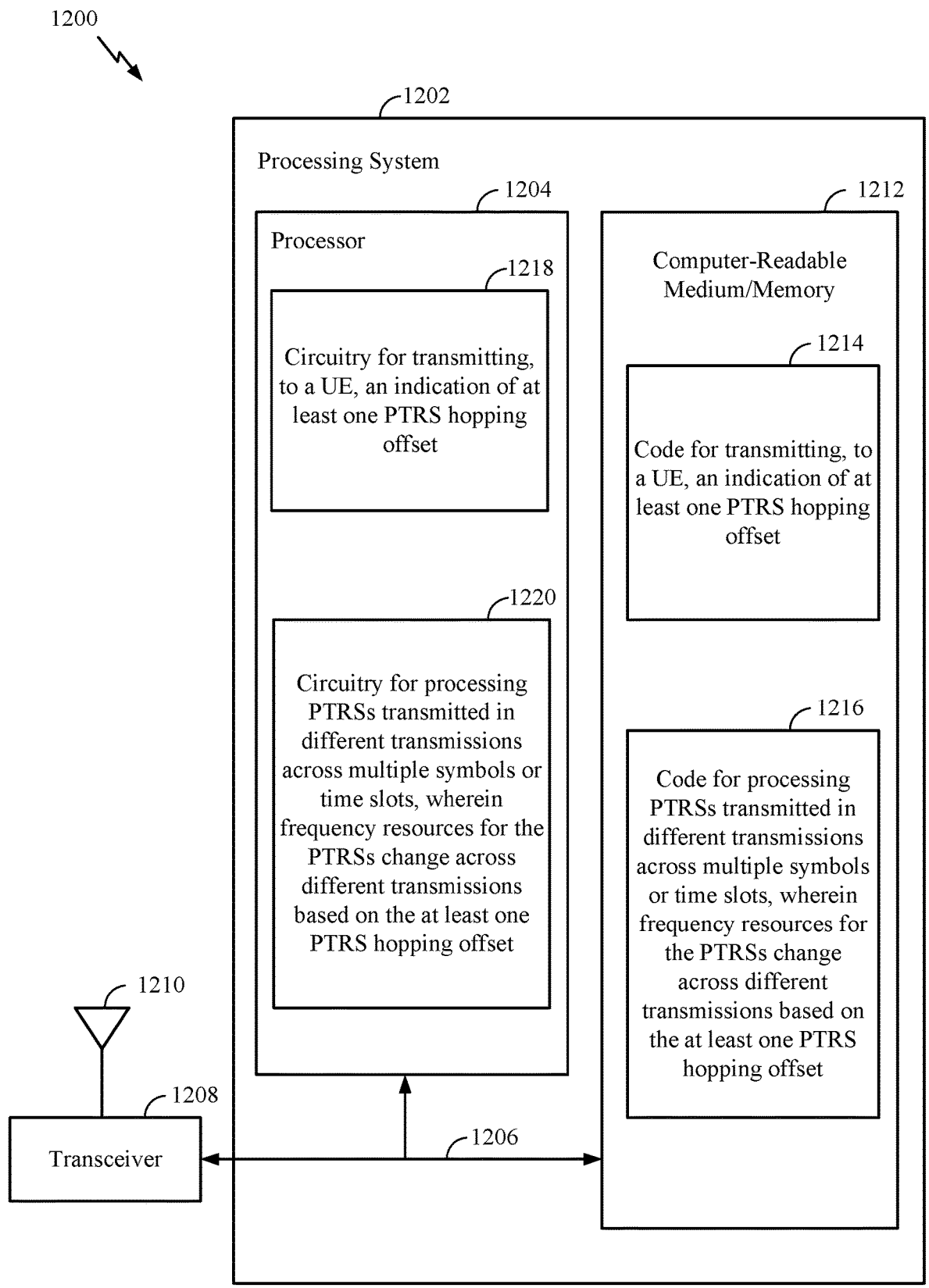
FIG. 12 illustrates a communications device that may include various components configured to perform operations for the techniques disclosed herein, in accordance with certain aspects of the present disclosure.

FIG. 12 illustrates a communications device 1200 that may include various components (e.g., corresponding to means-plus-function components) configured to perform operations for the techniques disclosed herein, such as the operations illustrated in FIG. 8. The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The processing system 1202 is configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., a computer-executable code) that when executed by the processor 1204, cause the processor 1204 to perform the operations illustrated in FIG. 8, or other operations for performing the various techniques discussed herein. In certain aspects, computer-readable medium/memory 1212 stores code 1214 for transmitting and code 1216 for processing. The code 1214 for transmitting may include code for transmitting to a UE an indication of at least one PTRS hopping offset. The code 1216 for processing may include code for processing PTRSs transmitted in different transmissions across multiple symbols or time slots wherein frequency resources for the PTRSs change across different transmissions based on the at least one PTRS hopping offset.

The processor 1204 may include circuitry configured to implement the code stored in the computer-readable medium/memory 1212, such as for performing the operations illustrated in FIG. 8, as well as other operations for performing the various techniques discussed herein. For example, the processor 1204 includes circuitry 1218 for transmitting and circuitry 1220 for processing. The circuitry 1218 for transmitting may include circuitry for transmitting to a UE an indication of at least one PTRS hopping offset. The circuitry 1220 for processing may include circuitry for processing PTRSs transmitted in different transmissions across multiple symbols or time slots wherein frequency resources for the PTRSs change across different transmissions based on the at least one PTRS hopping offset.

Example Aspects

Implementation examples are described in the following numbered aspects.

In a first aspect, a method for wireless communications by a user equipment (UE), comprising: receiving, from a network entity, an indication of at least one phase tracking reference signal (PTRS) hopping offset; and processing PTRSs transmitted in different transmissions across multiple symbols or time slots, wherein frequency resources for the PTRSs change across the different transmissions based on the at least one PTRS hopping offset.

In a second aspect, alone or in combination with the first aspect, the processing comprises at least one of: transmitting the PTRSs in uplink (UL) slots; or monitoring for the PTRSs in downlink (DL) slots.

In a third aspect, alone or in combination with one or more of the first and second aspects, receiving, from the network entity, signaling of a parameter indicating an initial value of a PTRS subcarrier for the PTRSs in a configurable transmission offset from an initial transmission.

In a fourth aspect, alone or in combination with one or more of the first through third aspects, the frequency resources for the PTRSs in each subsequent transmission are determined based on an algorithm based on a value of the PTRS subcarrier for a previous transmission and the at least one PTRS hopping offset.

In a fifth aspect, alone or in combination with one or more of the first through fourth aspects, detecting a collision between frequency resources determined for the PTRSs in a given transmission using the algorithm with a direct current (DC) subcarrier; and adjusting the frequency resources determined using the algorithm to avoid the collision.

In a sixth aspect, alone or in combination with one or more of the first through fifth aspects, receiving, from the network entity, signaling enabling or disabling PTRS hopping in the different transmissions across the multiple symbols or time slots according to the at least one PTRS hopping offset.

In a seventh aspect, alone or in combination with one or more of the first through sixth aspects, receiving, from the network entity, signaling indicating an updated PTRS hopping offset.

In an eighth aspect, alone or in combination with one or more of the first through seventh aspects, receiving, from the network entity, signaling indicating a reset of a number of hops; and determining PTRS frequency resources for a subsequent transmission based on an initial value of a PTRS subcarrier after the reset.

In a ninth aspect, alone or in combination with one or more of the first through eighth aspects, the different transmissions are part of an aggregated or a repetition mode of a transmission.

In a tenth aspect, alone or in combination with one or more of the first through ninth aspects, PTRS hopping is enabled in a physical uplink shared channel (PUSCH) transmission and a physical downlink shared channel (PDSCH) transmission, and one or more repetitions of the PUSCH transmission and the PDSCH transmission, according to the at least one PTRS hopping offset.

In an eleventh aspect, alone or in combination with one or more of the first through tenth aspects, the UE is configured with multiple codewords, and wherein the UE receives different PTRS hopping offsets for different codewords.

In a twelfth aspect, alone or in combination with one or more of the first through eleventh aspects, the indication indicates different PTRS hopping offsets based on one or more of different modulation and coding schemes (MCSs), different frequency ranges, bands, and subcarrier spacings.

In a thirteenth aspect, alone or in combination with one or more of the first through twelfth aspects, the indication indicates different PTRS configurations corresponding to different PTRS hopping offsets, and wherein the UE receives signaling to dynamically switch ON or OFF the different PTRS configurations.

In a fourteenth aspect, alone or in combination with one or more of the first through thirteenth aspects, the indication indicates different PTRS configurations corresponding to different PTRS hopping offsets, and wherein the UE receives signaling to enable a particular PTRS configuration from the different PTRS configurations.

In a fifteenth aspect, a method for wireless communication by a network entity, comprising: transmitting, to a user equipment (UE), an indication of at least one phase tracking reference signal (PTRS) hopping offset; and processing PTRSs transmitted in different transmissions across multiple symbols or time slots, wherein frequency resources for the PTRSs change across different transmissions based on the at least one PTRS hopping offset.

In a sixteenth aspect, alone or in combination with the fifteenth aspect, the processing comprises at least one of: monitoring for the PTRSs in uplink (UL) slots; or transmitting the PTRSs in downlink (DL) slots.

In a seventeenth aspect, alone or in combination with one or more of the fifteenth and sixteenth aspects, transmitting, to the UE, signaling of a parameter indicating an initial value of a PTRS subcarrier for the PTRSs in a configurable transmission offset from an initial transmission.

In an eighteenth aspect, alone or in combination with one or more of the fifteenth and seventeenth aspects, the frequency resources for the PTRSs in each subsequent transmission are determined based on an algorithm based on a value of the PTRS subcarrier for a previous transmission and the at least one PTRS hopping offset.

In a nineteenth aspect, alone or in combination with one or more of the fifteenth and eighteenth aspects, transmitting, to the UE, signaling enabling or disabling PTRS hopping in the different transmissions across the multiple symbols or time slots according to the at least one PTRS hopping offset.

In a twentieth aspect, alone or in combination with one or more of the fifteenth and nineteenth aspects, transmitting, to the UE, signaling indicating an updated PTRS hopping offset.

In a twenty-first aspect, alone or in combination with one or more of the fifteenth through twentieth aspects, transmitting, to the UE, signaling indicating a reset of a number of hops, wherein PTRS frequency resources for a subsequent transmission are determined based on an initial value of a PTRS subcarrier after the reset.

In a twenty-second aspect, alone or in combination with one or more of the fifteenth through twenty-first aspects, configuring multiple UEs in multi user (MU) multiple input multiple output (MIMO) mode with PTRS configurations; and transmitting to each UE rate matching patterns and PTRS configurations of other UEs.

In a twenty-third aspect, alone or in combination with one or more of the fifteenth through twenty-second aspects, the different transmissions are part of an aggregated or a repetition mode of a transmission.

In a twenty-fourth aspect, alone or in combination with one or more of the fifteenth through twenty-third aspects, PTRS hopping is enabled in a physical uplink shared channel (PUSCH) transmission and a physical downlink shared channel (PDSCH) transmission, and one or more repetitions of the PUSCH transmission and the PDSCH transmission, according to the at least one PTRS hopping offset.

In a twenty-fifth aspect, alone or in combination with one or more of the fifteenth through twenty-fourth aspects, the indication indicates different PTRS hopping offsets based on one or more of different modulation and coding schemes (MCSs), different frequency ranges, bands, and subcarrier spacings.

In a twenty-sixth aspect, alone or in combination with one or more of the fifteenth through twenty-fifth aspects, the indication indicates different PTRS configurations corresponding to different PTRS hopping offsets, and wherein the network entity sends signaling to the UE to dynamically switch ON or OFF the different PTRS configurations.

In a twenty-seventh aspect, alone or in combination with one or more of the fifteenth through twenty-sixth aspects, the indication indicates different PTRS configurations corresponding to different PTRS hopping offsets, and wherein the network entity sends signaling to the UE to enable a particular PTRS configuration from the different PTRS configurations.

An apparatus for wireless communication, comprising at least one processor; and a memory coupled to the at least one processor, the memory comprising code executable by the at least one processor to cause the apparatus to perform the method of any of the first through twenty-seventh aspects.

An apparatus comprising means for performing the method of any of the first through twenty-seventh aspects.

A computer readable medium storing computer executable code thereon for wireless communications that, when executed by at least one processor, cause an apparatus to perform the method of any of the first through twenty-seventh aspects.

Additional Considerations

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, allocating, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (UE) 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 7 and 8.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communication by a user equipment (UE), comprising:
one or more memories comprising instructions; and
one or more processors configured to execute the instructions and cause the apparatus to:
receive, from a network entity, an indication of at least one phase tracking reference signal (PTRS) hopping offset from multiple PTRS hopping offsets, wherein the multiple PTRS hopping offsets are based on different modulation and coding schemes (MCSs); and
process PTRSs transmitted in different transmissions across multiple symbols or time slots, wherein frequency resources for the PTRSs change across the different transmissions based on the at least one PTRS hopping offset.

2. The apparatus of claim 1, wherein the one or more processors are configured to execute the instructions and cause the apparatus to process the PTRSs by at least one of:
transmitting the PTRSs in uplink (UL) slots; or
monitoring for the PTRSs in downlink (DL) slots.

3. The apparatus of claim 1, wherein the one or more processors are configured to execute the instructions and cause the apparatus to receive, from the network entity, signaling of a parameter indicating an initial value of a PTRS subcarrier for the PTRSs in a configurable transmission offset from an initial transmission.

4. The apparatus of claim 3, wherein the frequency resources for the PTRSs in each subsequent transmission are determined based on an algorithm based on a value of the PTRS subcarrier for a previous transmission and the at least one PTRS hopping offset.

5. The apparatus of claim 4, wherein the one or more processors are configured to execute the instructions and cause the apparatus to:
detect a collision between frequency resources determined for the PTRSs in a given transmission using the algorithm with a direct current (DC) subcarrier; and
adjust the frequency resources determined using the algorithm to avoid the collision.

6. The apparatus of claim 1, wherein the one or more processors are configured to execute the instructions and cause the apparatus to receive, from the network entity, signaling enabling or disabling PTRS hopping in the different transmissions across the multiple symbols or time slots according to the at least one PTRS hopping offset.

7. The apparatus of claim 1, wherein the one or more processors are configured to execute the instructions and cause the apparatus to receive, from the network entity, signaling indicating an updated PTRS hopping offset.

8. The apparatus of claim 1, wherein the one or more processors are configured to execute the instructions and cause the apparatus to:
receive, from the network entity, signaling indicating a reset of a number of hops; and
determine PTRS frequency resources for a subsequent transmission based on an initial value of a PTRS subcarrier after the reset.

9. The apparatus of claim 1, wherein the different transmissions are part of an aggregated or a repetition mode of a transmission.

10. The apparatus of claim 1, wherein PTRS hopping is enabled in a physical uplink shared channel (PUSCH) transmission and a physical downlink shared channel (PDSCH) transmission, and one or more repetitions of the PUSCH transmission and the PDSCH transmission, according to the at least one PTRS hopping offset.

11. The apparatus of claim 1, wherein the UE is configured with multiple codewords, and wherein the UE receives different PTRS hopping offsets for different codewords.

12. The apparatus of claim 1, wherein the indication indicates different PTRS hopping offsets based on one or more of different frequency ranges, bands, and subcarrier spacings.

13. The apparatus of claim 1, wherein the indication indicates different PTRS configurations corresponding to different PTRS hopping offsets, and wherein the UE receives signaling to dynamically switch ON or OFF the different PTRS configurations.

14. The apparatus of claim 1, wherein the indication indicates different PTRS configurations corresponding to different PTRS hopping offsets, and wherein the UE receives signaling to enable a particular PTRS configuration from the different PTRS configurations.

15. An apparatus for wireless communication by a network entity, comprising:
one or more memories comprising instructions; and
one or more processors configured to execute the instructions and cause the apparatus to:
transmit, to a user equipment (UE), an indication of at least one phase tracking reference signal (PTRS) hopping offset from multiple PTRS hopping offsets, wherein the multiple PTRS hopping offsets are based on different modulation and coding schemes (MCSs); and
process PTRSs transmitted in different transmissions across multiple symbols or time slots, wherein frequency resources for the PTRSs change across different transmissions based on the at least one PTRS hopping offset.

16. The apparatus of claim 15, wherein the one or more processors are configured to execute the instructions and cause the apparatus to process the PTRSs by at least one of:
monitoring for the PTRSs in uplink (UL) slots; or
transmitting the PTRSs in downlink (DL) slots.

17. The apparatus of claim 15, wherein the one or more processors are configured to execute the instructions and cause the apparatus to transmit, to the UE, signaling of a parameter indicating an initial value of a PTRS subcarrier for the PTRSs in a configurable transmission offset from an initial transmission.

18. The apparatus of claim 17, wherein the frequency resources for the PTRSs in each subsequent transmission are determined based on an algorithm based on a value of the PTRS subcarrier for a previous transmission and the at least one PTRS hopping offset.

19. The apparatus of claim 15, wherein the one or more processors are configured to execute the instructions and cause the apparatus to transmit, to the UE, signaling enabling or disabling PTRS hopping in the different transmissions across the multiple symbols or time slots according to the at least one PTRS hopping offset.

20. The apparatus of claim 15, wherein the one or more processors are configured to execute the instructions and cause the apparatus to transmit, to the UE, signaling indicating an updated PTRS hopping offset.

21. The apparatus of claim 15, wherein the one or more processors are configured to execute the instructions and cause the apparatus to transmit, to the UE, signaling indicating a reset of a number of hops, wherein PTRS frequency resources for a subsequent transmission are determined based on an initial value of a PTRS subcarrier after the reset.

22. The apparatus of claim 15, wherein the one or more processors are configured to execute the instructions and cause the apparatus to:
configure multiple UEs in multi user (MU) multiple input multiple output (MIMO) mode with PTRS configurations; and
transmit to each UE rate matching patterns and PTRS configurations of other UEs.

23. The apparatus of claim 15, wherein the different transmissions are part of an aggregated or a repetition mode of a transmission.

24. The apparatus of claim 15, wherein PTRS hopping is enabled in a physical uplink shared channel (PUSCH) transmission and a physical downlink shared channel (PDSCH) transmission, and one or more repetitions of the PUSCH transmission and the PDSCH transmission, according to the at least one PTRS hopping offset.

25. The apparatus of claim 15, wherein the indication indicates different PTRS hopping offsets based on one or more of different frequency ranges, bands, and subcarrier spacings.

26. The apparatus of claim 15, wherein the indication indicates different PTRS configurations corresponding to different PTRS hopping offsets, and wherein the network entity sends signaling to the UE to dynamically switch ON or OFF the different PTRS configurations.

27. The apparatus of claim 15, wherein the indication indicates different PTRS configurations corresponding to different PTRS hopping offsets, and wherein the network entity sends signaling to the UE to enable a particular PTRS configuration from the different PTRS configurations.

28. A method for wireless communication by a user equipment (UE), comprising:
receiving, from a network entity, an indication of at least one phase tracking reference signal (PTRS) hopping offset from multiple PTRS hopping offsets, wherein the multiple PTRS hopping offsets are based on different modulation and coding schemes (MCSs); and
processing PTRSs transmitted in different transmissions across multiple symbols or time slots, wherein frequency resources for the PTRSs change across the different transmissions based on the at least one PTRS hopping offset.

29. The method of claim 28, wherein the processing comprises at least one of:
transmitting the PTRSs in uplink (UL) slots; or
monitoring for the PTRSs in downlink (DL) slots.

30. A method for wireless communication by a network entity, comprising:
transmitting, to a user equipment (UE), an indication of at least one phase tracking reference signal (PTRS) hopping offset from multiple PTRS hopping offsets, wherein the multiple PTRS hopping offsets are based on different modulation and coding schemes (MCSs); and
processing PTRSs transmitted in different transmissions across multiple symbols or time slots, wherein frequency resources for the PTRSs change across different transmissions based on the at least one PTRS hopping offset.

31. The method of claim 30, wherein the processing comprises at least one of:
monitoring for the PTRSs in uplink (UL) slots; or
transmitting the PTRSs in downlink (DL) slots.

* * * * *